INVENTORS
HARRY A. BARBER
EGON G. BERG
BY
ATTORNEYS

June 25, 1957  H. A. BARBER ET AL  2,796,811
MACHINE FOR LAYING ROADS

Filed June 3, 1953  8 Sheets-Sheet 5

INVENTORS
HARRY A. BARBER
EGON G. BERG
BY

ATTORNEYS

INVENTORS
HARRY A. BARBER
EGON G. BERG
BY
ATTORNEYS

June 25, 1957 H. A. BARBER ET AL 2,796,811
MACHINE FOR LAYING ROADS
Filed June 3, 1953 8 Sheets-Sheet 7

INVENTORS
HARRY A. BARBER
BY EGON G. BERG

ATTORNEYS

United States Patent Office 2,796,811
Patented June 25, 1957

2,796,811

MACHINE FOR LAYING ROADS

Harry A. Barber and Egon G. Berg, Aurora, Ill., assignors to Barber-Greene Company, Aurora, Ill., a corporation of Illinois Application June 3, 1953, Serial No. 359,356

11 Claims. (Cl. 94—46)

This invention relates to improvements in road finishing machines and more particularly to such machines which lay and finish bituminous or like paving materials along a roadway.

The present invention is the carrying forward of the successful principles of the road finishing machines as disclosed in the Harry H. Barber Patents Nos. 2,138,828 and 2,168,507 pertaining to the laying and finishing of bituminous or like paving materials and particularly relates to improvements on such machines.

A principal object of our invention is to provide a light compact mobile road finishing machine particularly adapted to lay and finish bituminous paving materials along a roadway and arranged with a view toward utmost simplicity and efficiency in construction and operation.

Another object of our invention is to provide a novel and improved self-propelled finishing machine for pavements, which eliminates the necessity of a heavy screed at the rear of the machine riding on the finished pavement, and still retains the leveling principles developed under the foregoing patents.

Still another object of our invention is to provide a readily maneuverable rubber tire mounted road finishing machine wherein the center of weight of the machine is shifted from the rear of the machine to a location between the front and rear axles of the machine without resorting to counter weights, by utilizing a novel construction and arrangement of strike off unit in place of the usual heavy screed.

A still further object of our invention is to provide a novel and efficient form of road finishing machine, replacing the usual heavy screed with automatically adjustable light weight oscillating strike-off blades.

Still another object of our invention is to provide a rubber tire mounted paving machine having aligned strike-off frames supported at the rear of the machine for vertical adjustment with respect thereto and for movement about an axis extending longitudinally of the machine, to vary the crown of the roadway, and having lapping strike-off blades suspended therefrom and oscillatably driven in opposite phase relationship with respect to each other, for striking off and leveling the pavement as it is laid along the roadway.

A further object of our invention is to provide a novel and improved form of finishing machine for pavements having a front traction unit and a light weight rear strike-off unit with draw bar means for the strike-off unit comprising parallel links accommodating the strike-off unit for free up and down movement, and having hydraulic cylinder and piston units holding the strike-off unit in position, and automatically supporting the weight of the strike-off unit in accordance with the leveling requirements dictated either by manual control for thickness, or the changes caused by undulations in the unfinished surface supporting the tractor unit.

Still another object of our invention is to provide a road finishing machine of a simple and improved form having a strike-off unit suspended from a traction unit therefor, to the rear thereof on hydraulic cylinders and pistons, with valve means controlling the admission and release of fluid under pressure to the cylinders and pistons, leveling shoes pivoted to the strike-off frame adjacent the ground and yieldably supported on said strike-off frame for floating engagement with the finished pavement and connected with the valve means for the hydraulic cylinders and pistons to adjust the strike-off means to conform to the grade of the roadway, together with manually operable means on the main frame for operating the valve means independently of the leveling shoes.

Still another object of our invention is to provide a road finishing machine wherein the leveling means is yieldably supported on the strike-off frame to enable manual adjustment of the amount of weight desired on the leveling shoes riding on the finished pavement to avoid marking of the pavement.

Still another object of our invention is to provide a road finishing machine having a forward traction unit and a rear strike-off unit suspended by cylinder and piston means, wherein the pavement is maintained level by leveling shoes pivoted to the strike-off frame and thickness of the pavement is controlled by tilting the shoes under manual control.

These and other objects of our invention will appear from time to time as the following specification proceeds and with reference to the accompanying drawings wherein:

In the embodiment of our invention illustrated in the drawings, we have shown generally a traction unit 10 and a strike-off unit 11 suspended therefrom adjacent the rear end thereof on spaced cylinder and piston units 13, 13. The strike-off unit is drawn with the traction unit to finish the pavement being laid and is guided for vertical movement with respect to the ground by a plurality of pairs of laterally spaced parallel links 14 and 15 pivotally connected to said main frame at one of their ends and extending rearwardly therefrom, and to said strike-off unit at their opposite ends, and serving as draw bars and guide means for the traction unit, as will hereinafter more clearly appear as the present specification proceeds.

The traction unit 10 is shown as including a main frame 16 having parallel spaced side frame members 17, 17, extending rearwardly therealong from a hopper unit 19. The hopper unit 19 is shown as extending across the front of the traction unit and as having two parallel spaced conveyors 20, 20, extending along the bottom thereof and along said main frame to a discharge point adjacent the rear end thereof, for conveying the paving material to two laterally spaced spreader screws 21, 21. The spreader screws 21, 21 are shown as extending transversely of said main frame and are power driven to spread the paving material over the roadway, to be struck off by the strike-off unit 11, as the traction unit advances along the roadway (see Figures 1 and 13).

The traction unit 10 is shown as being supported on rear rubber tire mounted traction wheels 23, 23 and on front steering wheels 24, 24. It is of course obvious that the traction unit need not be supported on wheels, but may be supported on continuous traction tread devices as well. Pusher rollers 25, 25 are also shown as extending transversely of the machine, to enable the traction unit to push a truck when unloading paving material into the hopper unit 19 (see Figures 1 and 2). The pusher rollers 25, 25 may be extensibly mounted with respect to the front end of the main frame 16 and may be yieldably biased in extended relation with respect to said main frame to yield inwardly upon engagement with a truck. The mounting for said rollers and the spring biasing means therefor are not herein shown or described since they may be of any form well known to those skilled in the art, and are no part of my present invention.

A motor 27 diagrammatically shown as being a gasoline engine, is mounted on the main frame 16 rearwardly of the hopper 19. The motor 27, however, need not be a gasoline engine, but may be an electric motor or any other form of power means or prime mover desired. An operator's seat 29 extends upwardly from a platform 28 on the main frame 16. The seat 29 is shown as being located to the rear of the motor 27 and to one side thereof, in accessible relation with respect to a steering wheel 30, for steering the traction unit 10, by the front steering wheels 24 through any well known form of steering linkage and mechanism, and no part of my present invention so not herein shown.

Figure 13:
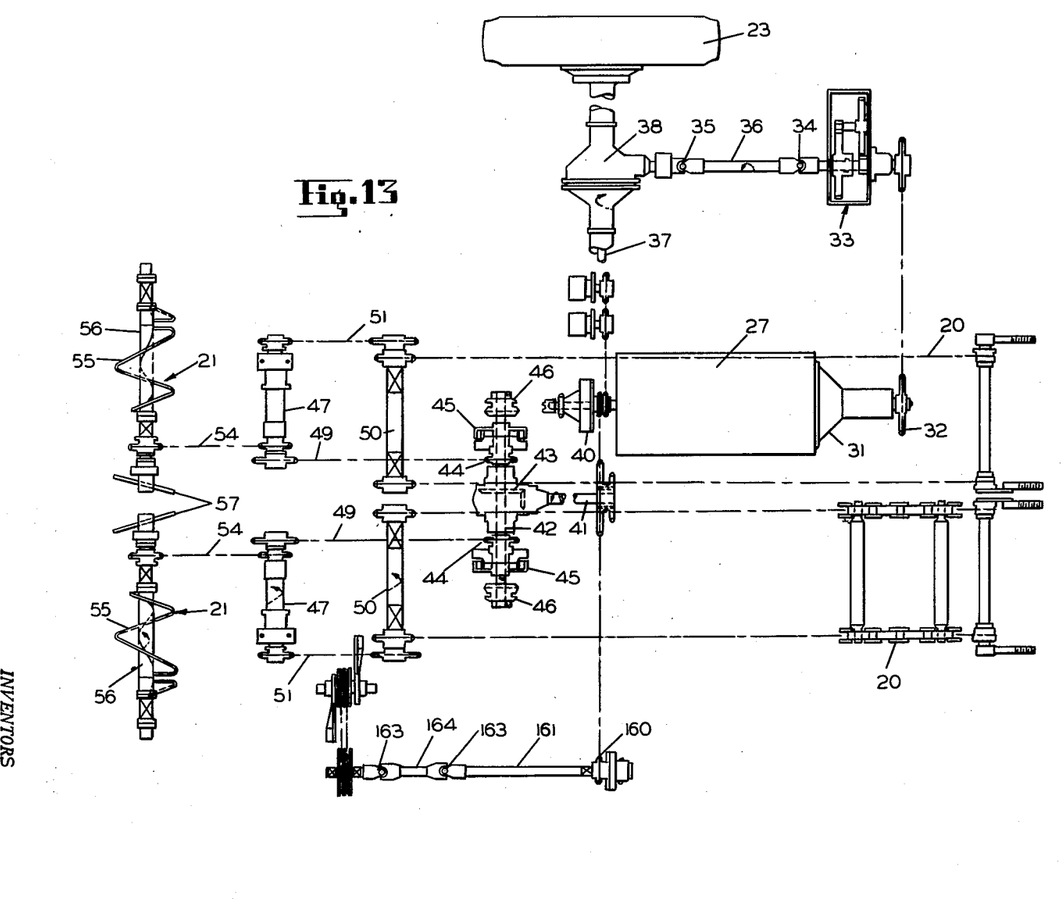
Figure 13 is a diagrammatic view, schematically illustrating the drive mechanisms for the various operative parts of the machine in an expanded schematic plan view.

The drive from the motor 27 to the traction wheels 23 is shown in Figure 13 as being from the front end of said motor through a clutch and transmission indicated generally by reference character 31 and a chain and sprocket drive 32, driving a transmission 33. The drive from the transmission 33 is through universal couplings 34 and 35, and a drive shaft 36 connected therebetween. The coupling 35 is connected to drive axles 37 through the usual differential 38. The axles 37 are shown as being connected with the wheels 23, 23 through reduction gearing indicated generally by reference character 39 (see Figure 1).

Figure 2:
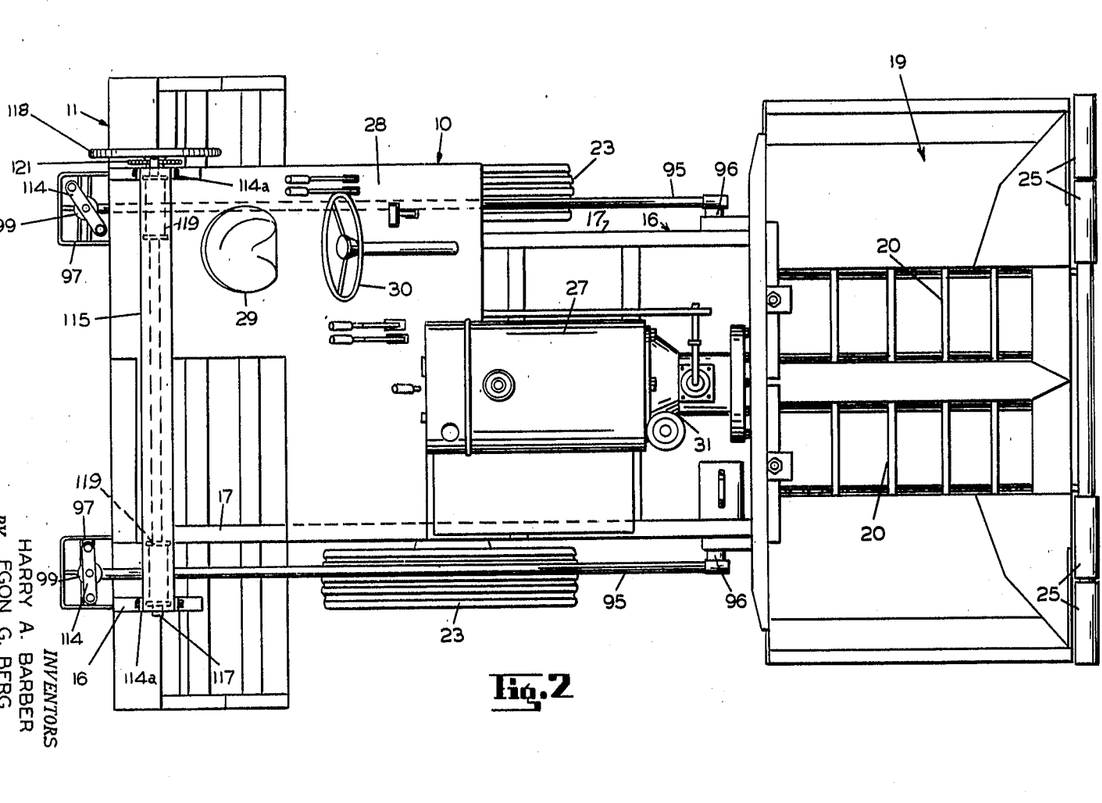
Figure 2 is a plan view of the machine shown in Figure 1 with certain parts thereof shown diagrammatically.
Figure 3:
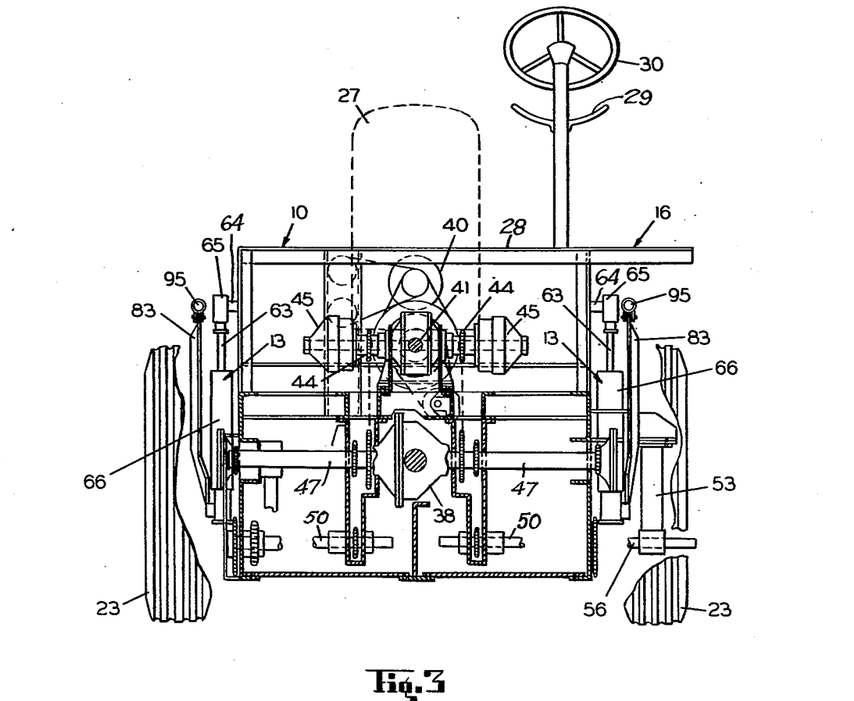
Figure 3 is a transverse sectional view taken through the machine and looking from the forward toward the rear end thereof.

The conveyors 20, 20 form the bottom of a hopper unit 19, and discharge paving material in the path of the spreader screws 21, 21. Said conveyors are shown in Figures 2 and 13 as being well known forms of chain and flight conveyors arranged side by side although they need not be so arranged, and also may be any form of conveyor desired. The drive to the conveyors 20, 20 is from the rear end of the motor 27 through a suitable clutch mechanism and chain and sprocket drive 40 selectively operable to drive a longitudinal shaft 41. The longitudinal shaft 41 in turn drives a transverse shaft 42 through bevel reduction gearing 43. The transverse shaft 42 is shown as being operable to selectively drive sprockets 44, 44, through individual clutches 45, 45, which may be of any well known form. Engagement of the clutches 45, 45 may be independently controlled at the selection of the operator, through clutch collars 46, 46. The sprockets 44, 44 are shown as driving forwardly spaced transverse shafts 47, 47 by means of chain and sprocket drives 49, 49. The transverse shafts 47, 47 are shown as being connected with the conveyor drive shafts 50, 50 by means of chain and sprocket drives 51, 51.

The spreader screws 21, 21 are shown as being journaled in arms 53, 53 depending from the frame 16, just rearwardly of the discharge ends of the conveyors 20, 20 and are rotatably supported by said arms between the discharge ends of the conveyors 20, 20 and the strike-off unit 11. The drive to said spreader screws is through chain and sprocket drives 54, 54 driven from the transverse shafts 47, 47. The spreader screws 21, 21 are shown as being well known forms of spiral conveyors including conveying spirals 55, 55 on transverse shafts 56, 56, intermediate the support arms 53, 53 therefor. Each shaft 56 is shown as extending inwardly of the inner support arm 53, and inwardly of the drive sprockets therefor, and as having agitating blades 57, 57 on the inner ends thereof. While the shafts 56, 56 are shown as ending at the outer bearing supports on the outer arms 53, 53, said shafts may be extended from said bearing supports and may have additional spreader screws thereon, where the roadway is wider than can conveniently be accommodated by the spreader screws 55, 55 between the support arms 53, 53.

Referring now in particular to the strike-off unit 11, two spaced upright supports 60, 60 are shown as being provided to suspend the cylinder and piston units 13, 13 from the rear end portions of the side frame members 17, 17 of the main frame 16. As herein shown, each upright support 60 is suitably secured to and extends upwardly from a side frame member 17. The support 60 is shown as being connected with a piston rod 63 of the cylinder and piston unit 13 by means of a ball and socket connection 61 on the inner end of a transverse pin 64. The transverse pin 64 in turn is shown as being secured to and extending laterally inwardly from a hanger member 65, on the upper end of the piston rod 63, and may likewise be pivotally connected thereto. The piston rod 63 is shown as being extensible from a cylinder 66, having a housing 67 connected with its head or lower end, and depending therefrom. A connecting member 69 is shown as depending from the valve housing 67, and as being pivotally connected between spaced transverse gusset plates 70, 70, as by a pivot pin 71.

Figure 9:
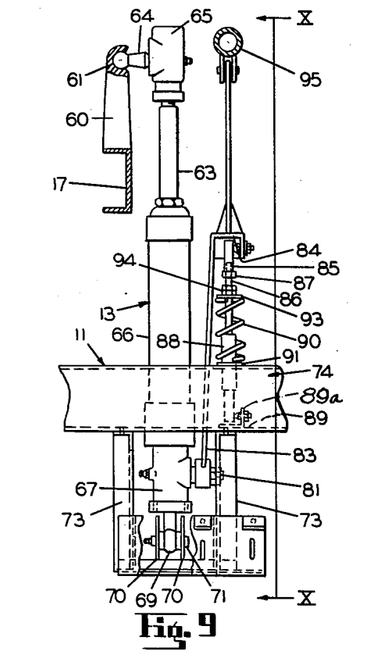
Figure 9 is a fragmentary end view of the strike-off unit for the left hand side of the machine, with certain parts thereof broken away in order to more clearly illustrate the suspension and leveling control for the strike-off frame.
Figure 10:
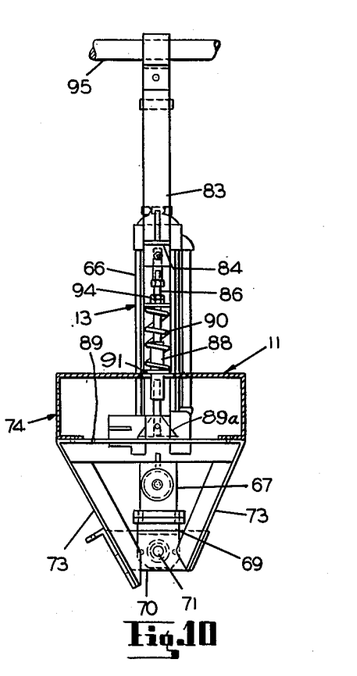
Figure 10 is a fragmentary transverse sectional view taken substantially along lines X—X of Figure 9.
Figure 11:
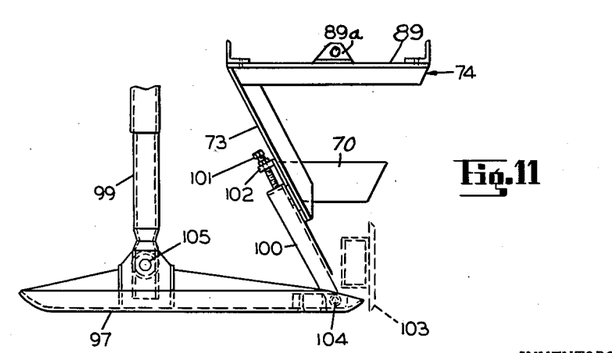
Figure 11 is an enlarged detail view illustrating the connection of a leveling shoe to the strike-off frame and the adjusting means therefor.
Figure 12:
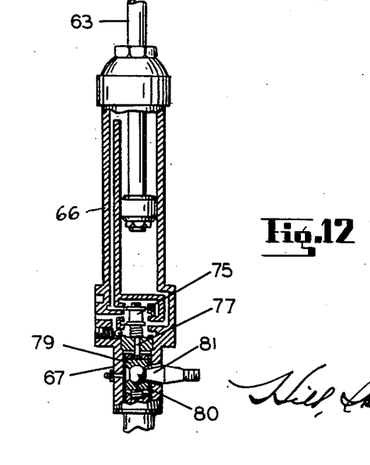
Figure 12 is an enlarged detail fragmentary sectional view illustrating the valve and leveling cylinder construction, suspending the strike-off to the frame for the traction unit for the machine.

The gusset plates 70, 70 are shown as connecting together converging depending inclined frame members or angles 73, 73 of a frame 74 for one-half of the screed unit 11 (see Figure 10). The housing 67 is shown as having a valve 75 therein at the head end of the cylinder 66 and movable into position to supply fluid under pressure to either the head or piston rod ends of said cylinder, to adjust the elevation of the strike-off unit 11 in accordance with the contour of the ground (see Figure 12). As shown in Figure 12 the valve 75 has a stem 77 extending downwardly therefrom connected with a socketed block 79 slidable along the housing 67. The socketed block 79 is shown as having a ball 80 mounted therein, from which extends a stud 81 pivotally connected to the lower end of an operating or control link 83 (Figure 9).

The cylinder and piston unit 13, including the housing 67, valve 75 and operating means therefor may be a well known form of power steering booster modified to suit the present structure. This power steering booster may be of a well known commercial form, so need not herein be described further.

The control link 83 is shown as extending upwardly from the stud 81 and as having an intermediate shouldered portion 84 from which depends an internally threaded sleeve 85. The sleeve 85 is shown as having a depending rod 86 threaded therein, and locked thereto as by lock nut 87. The rod 86 is shown as being slidably guided in a sleeve 88 pivotally mounted on a transverse angle 89 of the associated strike-off frame 74 on an ear 89a. A spring 90 encircles the sleeve 88 and lower portion of the threaded rod 86, and is interposed between a collar 91 welded or otherwise secured to said sleeve, and a collar 93 freely mounted on the rod 86, and abutted by the lower nut of a pair of lock nuts 94 threaded said rod. The spring 90 thus forms a yieldable support for the control link 83 and operating mechanism therefor, to carry the weight of the operating mechanism and increase the sensitivity of valve movement, as will hereinafter more clearly appear as this specification proceeds.

The control link 83 is shown as being pivotally connected at its upper end to an associated leveler arm 95. Each leveler arm 95 extends along one side of the traction unit 10 beyond the rear end of the strike-off unit 11, and is pivotally connected to said traction unit at its forward end, intermediate the ends of said traction unit, as by a transverse pivot pin 96. The rear end of each leveler arm 95 is shown as being transversely pivoted to and operated by a control or leveler shoe 97, through a vertical leg 99 (see Figures 1 and 5).

Each leveling shoe 97 in turn is shown as being transversely pivoted to an adjustable leg 100, depending from an associated rear inclined frame member 73. As herein shown the leg 100 extends downwardly from the frame member 73, to a position adjacent the lower end portion of a strike-off blade 103 of the strike-off unit 11 and is adjustably moved with respect to said strike-off blade by an adjusting screw 101, rotatably secured thereto, and threaded in a lug 102, extending outwardly from the frame member 73. A pivot pin 104 is shown as pivotally connecting said arm to the leveling shoe 97, to pivot about a transverse axis closely adjacent the lower end portion of the adjacent strike-off blade 103.

Figure 1:
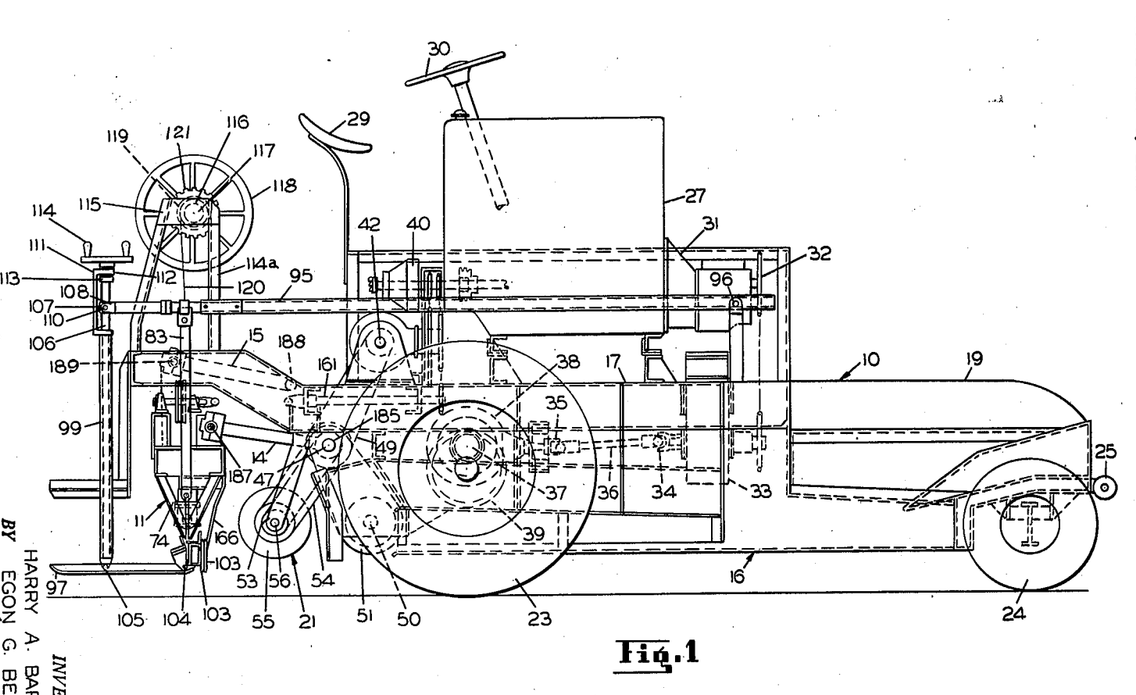
Figure 1 is a view in side elevation of a road finishing machine constructed in accordance with our invention, with certain parts thereof broken away.
Figure 5:
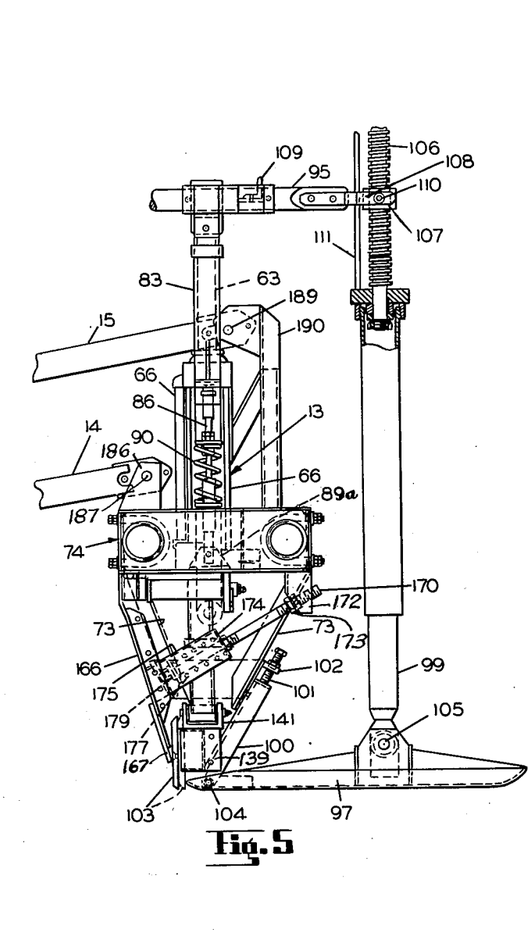
Figure 5 is a fragmentary end view of the strike-off unit looking along lines V—V of Figure 4.

The leg 99 is shown in Figures 1 and 5 as being in the form of a pipe or tube pivotally connected with the leveler shoe 97 toward the rear end thereof on a ball and socket 105. A threaded shaft 106 is herein shown as being secured to and rotatably mounted on the upper end portion of the tube 99 and as having a nut 107 threaded thereon. The leveling arm 95 has a bifurcated connector 108 extending rearwardly therefrom, the furcations of which extend along opposite sides of the nut 107, and are pivotally connected thereto as by trunnion pins 110. A bracket member 111 is shown as being secured to the top of the tube 99 and as extending outwardly therefrom and vertically upwardly with respect thereto. The bracket member 111 has an inwardly extending portion 112 in alignment with the threaded shaft 106 and through which said shaft extends. A collar 113 is secured to the threaded shaft 106 and abuts the underside of the boss 112. A hand wheel 114 is suitably secured to the upper end of the shaft 106 and rests on the upper side of the boss 112. Upon turning of the hand wheel 114, the threaded nut 107 will move upwardly along the threaded shaft 106 and operate the valve 75 and change the level of the associated strike-off blade 103. The purpose of this adjustment is to adjust the strike-off blade to control the thickness of the pavement, it being understood that as the leveling arm 95 moves upwardly, that the valve 75 will be operated to raise the strike-off blade 103 therewith.

Figure 4:
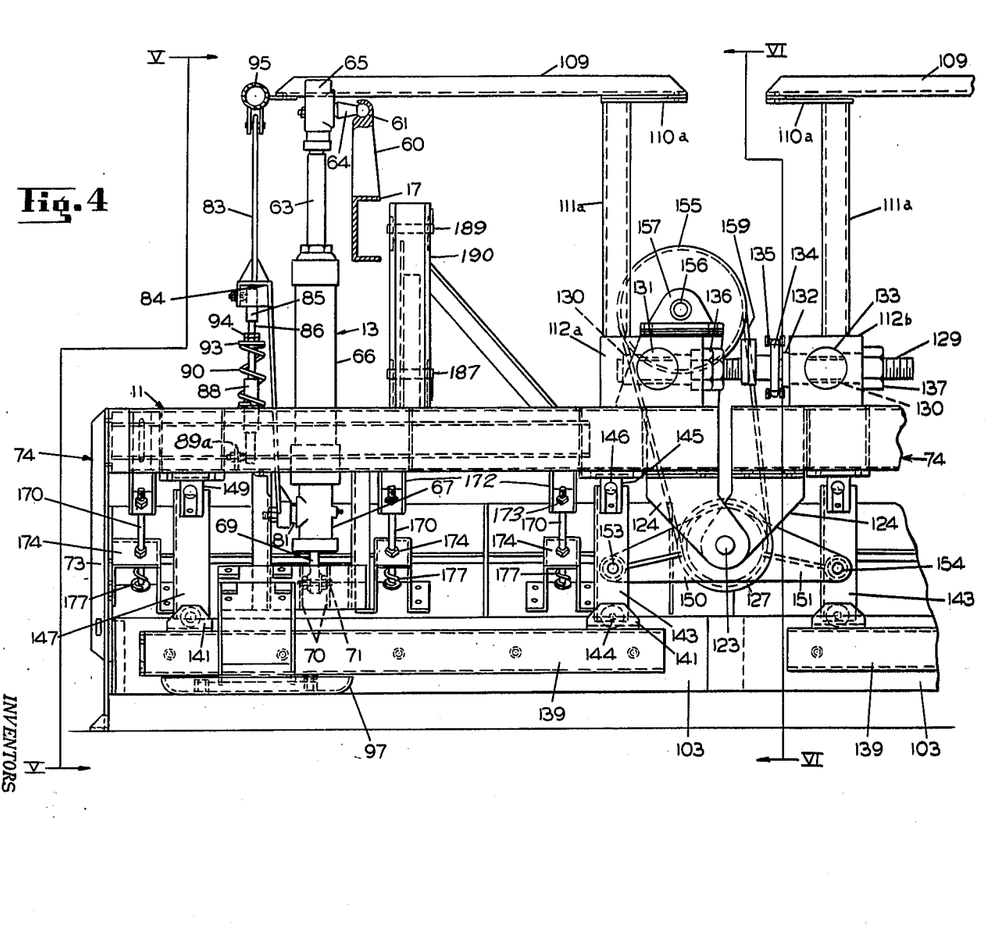
Figure 4 is a fragmentary rear end view of the machine showing the strike-off unit and the support and adjusting means therefor.

Each leveling arm 95 is stabilized and retained from lateral movement by means of a transverse tie bar 109. Each tie bar 109 is shown as being secured to a leveling arm 95 at its outer end, as by welding and as being vertically pivoted to a support strap 110a, on the upper end of a post 111a. The post 111a is shown in Figure 4 as extending upwardly from the top of a box frame 112a, mounted on the top of the frame member 74 adjacent the inner end thereof. The tie bar 109 is spaced above the strap 110a to accommodate said tie bar for limited vertical movement with the arm 95. The tie bar 109 is likewise pivoted to the strap 110a for movement about a vertical axis, to accommodate said tie bar to conform to angular movement of the leveling arm 95 and the link 83, pivotally connected thereto. It should be understood that as the leveling arm 95 moves vertically, that the post 111a and strike-off unit 11 move vertically therewith.

A manually operable means is provided to operate the valve 75 and lift the strike-off unit 11 under manual control as desired. As herein shown, a frame structure 114a extends upwardly from each outer side of the main frame 16. The frame structures 114a, 114a are shown as being connected together by a tie beam 115, and are shown as having bearing bosses 116, 116 therein, forming bearing supports for a transverse shaft 117. The transverse shaft 117 is shown as having a hand wheel 118 on the left hand end thereof, and as having two spaced drums 119, 119 secured thereto and having flexible cables 120, 120 extending downwardly therefrom for connection with an associated leveling arm 95. The cables 120, 120 are connected at their lower ends to the leveling arms 95, 95 so that rotation of the shaft 117 by the hand wheel 118 in a direction to raise the leveling arms 95, 95 will operate the valves 75, to admit fluid under pressure to the piston rod ends of the cylinders 66, 66 and elevate the entire strike-off unit along the piston rods 63, 63. A pawl and ratchet device 121 is provided to hold the hand wheel 118 and shaft 117 from rotation when it is desired to retain the strike-off unit 11 in a desired position of elevation.

As has previously been mentioned, the strike-off unit 11 is in two sections, each of which is of a similar construction. The sections are pivotally connected together at their adjacent ends for adjustable movement about a longitudinal shaft 123, extending along the longitudinal center of the machine. Each frame member 74 has two spaced arms 124 extending downwardly and angularly inwardly from its inner end adjacent opposite sides thereof. The arms 124, 124 are shown as lapping each other and as being pivotally connected together by the shaft 123. The shaft 123 is shown as having two spaced eccentrics 125 and 126 journaled thereon between the arms 124, 124 and on opposite sides of drive pulleys 127, 127 therefor. The eccentrics 125 and 126 are best shown in Figure 6 and may be positioned 180° out of phase, to oscillatably drive the strike-off blades 103, 103 in opposite phase relation with respect to each other, as will hereinafter more clearly appear as this specification proceeds.

The frame structures 74, 74 are adjusted about the axis of the transverse shaft 123 to vary the angle of the strike-off blades 103, 103 with respect to each other and to provide the desired crown to the roadway in either a positive or negative direction with respect to the center of the roadway. As herein shown, parallel spaced threaded shafts 129, 129 are provided to vary the angular relationship of the strike-off blades 103, 103 with respect to each other and to hold the frame structures 74, 74 and the strike-off blades 103, 103 in position. Each transverse shaft 129 is shown as being threaded within a block 130, trunnioned in a box 112a on trunnion supports 131, 131, pivotally mounted in the side walls of the box 112a. The opposite end portion of the shaft 129 is shown as being threaded within a block 132 trunnional in opposite side walls of a box 112b on trunnion pins 133, 133. The parallel shafts 129, 129 are shown as being rotated by sprockets 134, 134, keyed or otherwise secured thereto, and connected together by an endless chain 135. The two shafts 129, 129 will thus turn together, to pivot the frame structures 74, 74 with respect to each other about the axis of the longitudinal shaft 123, as desired. Lock nuts 136, 136 and 137 are provided to lock the shafts 129, 129 from rotation and hold the strike-off blades 103, 103 in the desired position of adjustment with respect to each other to provide the roadway with the desired crown.

Figure 6:
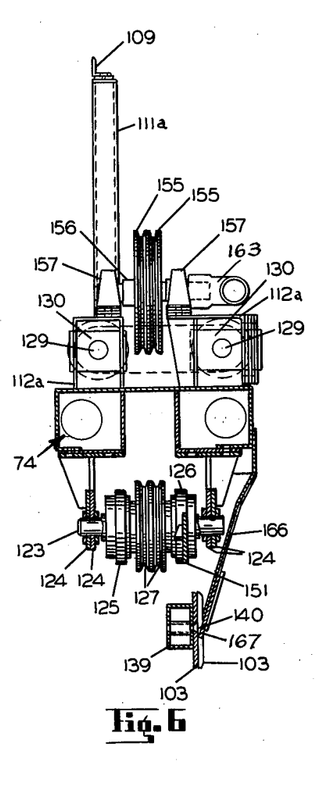
Figure 6 is a transverse sectional view taken through the strike-off unit and looking along lines VI—VI of Figure 4.
Figure 7:
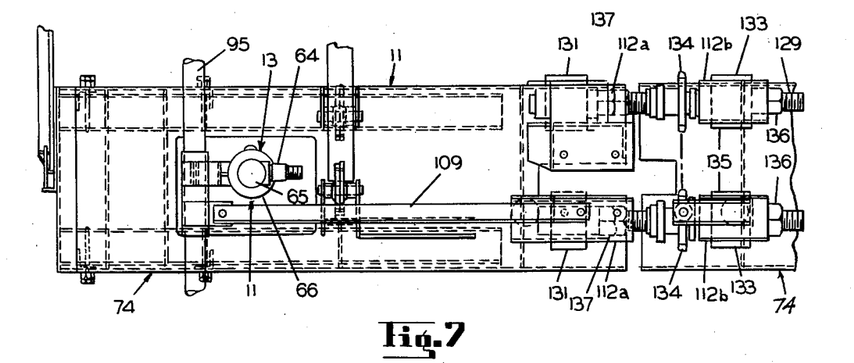
Figure 7 is a fragmentary plan view of the strike-off unit.
Figure 8:
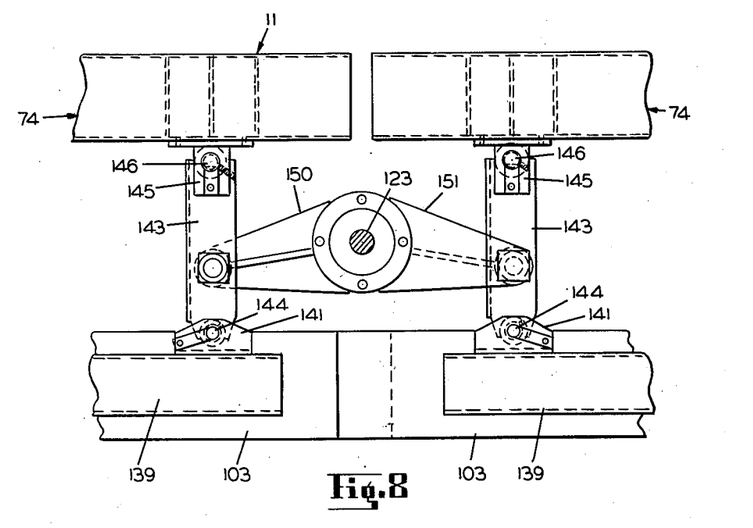
Figure 8 is a fragmentary end view looking toward the central portion of the strike-off unit with the pivotal connection for the strike-off frames therefor broken away in order to illustrate the drive connection to the reciprocating strike-off blades.

The strike-off blades 103, 103 are shown in Figures 1, 4 and 6 as overlapping at their inner ends and as having box-like girders 139, 139 secured to and extending along the rear faces thereof for substantially the entire length thereof. The girders 139, 139 may be secured to said strike-off blades as by rivets 140, 140, and may terminate in spaced relation with respect to adjacent ends of said strike-off blades to accommodate said blades to lap each other, and to accommodate reciprocable movement of said blades with respect to each other.

The girders 139 each have connectors 141, 141 extending upwardly therefrom, adjacent opposite ends thereof, and herein shown as being generally U-shaped in cross section. Each inner connector 141 has a link 143 pivotally connected thereto as by a longitudinal extending pivotal pin 144. The upper end of the link 143 is shown as being pivotally connected to a bracket member 145 depending from the frame member 74 on a longitudinal extending pivot pin 146. In a like manner outer links 147 are pivotally connected at their lower ends to the brackets 141, 141 and at their upper ends to brackets 149, 149, depending from the frame member 74, adjacent the outer ends thereof. The strike-off blades 103, 103 are thus each suspended from the individual frame members 74, 74 for movement along said frame members transversely of the roadway on the parallel links 143 and 147.

The strike-off blades 103, 103 are reciprocably driven from the eccentrics 125 and 126 in opposite phase relation with respect to each other by eccentric straps 150 and 151 pivotally connected with opposite inner links 143, 143. The eccentric strap 150 is shown as being journalled on the eccentric 125 and as having pivotal connection with left hand link 143 by a pivot pin 153. The eccentric strap 151 is likewise journalled on the eccentric 126 and is connected with the right hand strike-off blade 103 and link 143, by means of a pivot pin 154.

The eccentrics 125 and 126 are shown as being rotatably driven from drive pulleys 155, 155 on a longitudinally extending shaft 156 (see Figures 4 and 13). The shaft 156 is journalled on opposite sides of the pulleys 155, 155 on bearing brackets 157, 157, extending upwardly from the frame member 74. The pulleys 155, 155 are shown as driving the pulleys 127, 127 and eccentrics 125 and 126 through endless belts 159, 159. The shaft 156 is shown as being driven from the rear end of the motor 27 by a chain and sprocket drive 160, driving a longitudinal shaft 161, journaled in the frame for the traction unit 10. The shaft 161 has driving connection with the shaft 156, on the strike-off unit 11, by means of two spaced universals 163, 163, which may be of the slip joint type, to accommodate vertical movement of the strike-off unit 11 with respect to the traction unit 10. The universals 163, 163 are shown as being connected together by a drive shaft 164.

The inner sides of the strike-off blades 103, 103, facing the spreader screws 21, 21 are each contacted by a deflector plate 166 (see Figures 1, 5 and 6). The purpose of this deflector plate is to hold the paving material to the strike-off blades 103, 103 and to prevent the paving material from riding up over the tops of said strike-off blades 103, 103 into the support and drive mechanism therefor. As shown in Figures 5 and 6 the deflector plate 166 is secured to the inner side of the frame member 74 and depends vertically therefrom for a portion of its length and then curves inwardly and downwardly toward the associated strike-off blade 103. A scraper blade 167 is shown as being secured to and extending along the lower end of the deflector plate 166, and as slidably engaging an associated strike-off blade 103, for substantially the length thereof.

The scraper blades 167, 167 are shown as being yieldably maintained in engagement with the strike-off blades 103, 103 by means of compression springs 177, 177, encircling threaded rods 170, 170 spaced along the frame structure 74 (see Figures 4 and 5). As herein shown, each threaded rod 170 extends from a bracket 172 depending from the rear end of the frame 74, and is secured thereto as by nuts 173, 173 threaded on said rod and engaging opposite sides of said bracket. The threaded rod 170 extends angularly downwardly and forwardly from the bracket 172 through a wall 174 of a spring retainer 175, extending angularly upwardly from the deflector plate 166 from a point high enough to clear the reciprocating strike-off blades 103, 103. The spring 177 encircling the threaded rod 170 is interposed between a nut and collar 179 on the end of the rod 170 and the wall 174 of the spring retainer 175, to yieldably bias the scraper bar 167 into engagement with the strike-off blade 103.

It should be noted with reference to Figures 1 and 5 that while the strike-off unit is suspended from the side frame members 17, 17 of the tractor unit 10 by the cylinder and piston units 13, that said strike-off unit is likewise connected with the tractor unit and the main frame therefor by means of the draw bar means for the strike-off unit comprising the parallel links 14 and 15, which serve to support and positively draw the strike-off unit with the traction unit during travel thereof, and to retain said strike-off unit in parallel planes throughout its range of adjustment. As herein shown, one pair of parallel links 14 and 15 is provided for each side of the strike-off unit. The link 14 is shown as being journaled on the drive shaft 47 at its rear end for pivotal movement about the axis of said drive shaft. The opposite end of the link 14 is shown as being pivotally mounted between two parallel spaced bracket members 186, 186 on a pivot pin 187 (see Figures 1 and 5).

The upper parallel link 15 is shown as being transversely pivoted to the frame 16 in vertically spaced relation with respect to the counter shaft 47 on a pivot pin 188. The opposite end of the parallel link 15 is shown as being connected with the frame member 74 on a pivot pin 189, mounted adjacent its ends on the upper end portion of an upright bracket 190, extending upwardly from the frame member 74, adjacent the rear end thereof.

In operation of the paving machine, the leveling or control shoes 97, 97 may first be adjusted to the desired thickness of the layer of pavement by adjusting the length of the links connecting said leveling shoes with the leveling arms 95, 95 by operation of the hand wheels 114, 114. This in turn will operate the valves 75, 75 for the respective cylinder and piston units 11, 11 through the leveling arms 95, 95 and the control links 83, 83 connected thereto. This is attained by vertical movement of the control links 83, 83 by the leveling arms in accordance with the changing position of the leveling shoes and arms, until the strike-off unit has been raised or lowered to a point where the leveling shoes 97, 97 are parallel with the roadway. At this time an equilibrium between the leveling arms 95 leveling shoes 97 and strike-off unit 11 is reached and the valves 75, 75 will shut off and hold the strike-off unit in position.

Assuming that the strike-off blades 103, 103 are set for the desired crown, and the machine is otherwise ready for laying and leveling a pavement, a truck (not shown) may follow the machine and be pushed by the pusher rolls 25, 25 and discharge paving material into the hopper unit 19. The conveyors 20, 20 being in operation, will progress the paving material along the traction unit toward the rear end thereof and discharge it in the path of the spreader screws 21, 21, laterally spreading the paving material across the roadway.

The strike-off blades 103, 103, being reciprocably driven in opposite phase relationship through the eccentrics 125 and 126, and the eccentric straps 150 and 151 will strike-off the pavement to the required thickness and level the same. During this striking off operation, the deflecting plates 166, 166 and the scraper bars 167, 167 thereon will retain the paving material to the strike-off blades 103, 103, to be struck-off and leveled by said strike-off blades during reciprocation thereof.

Where the grade of the unpaved part of the roadway along which the traction unit 10 is traveling varies, the pivot pins 96 connecting the leveling arms 95, 95 to the front end of the traction unit will move upwardly or downwardly with said traction unit, in accordance with the variation in the roadway. The shoes 97, 97 floating on the finished pavement, will pivot about their axes of pivotal connection to the strike-off frame, as the leveling arms 95, 95 pivot upwardly or downwardly about the axes of the pivot pins 96, 96 at the front end of the traction unit. This will cause relative movement between the leveling arms 95, 95 and the strike-off unit 11 in a vertical direction and will operate the valves 75, 75 through the control arms 83, 83 yieldably supported on the frame members 74, 74. This will raise or lower the strike-off unit as conditions require, until the leveling shoes 97, 97 are again parallel with the roadway. Variations in grade will thus be automatically compensated for by operation of the cylinder and piston units 13, 13 under the control of the leveling shoes 97, 97 and leveling arms 95, 95.

Since the leveling arms 95, 95 pivot about axes spaced adjacent the forward end of the traction unit and a substantial distance forwardly of the strike-off unit 11, the reaction of said leveling arms due to grade changes will be a delayed reaction, which will be in the nature of an action anticipating the grade changes ahead of the strike-off unit and preventing sudden changes in the grade struck-off by the strike-off blades 103, 103 with a resultant undulating pavement.

It may further be seen that the anticipation or delayed reaction to the total change, nullifying temporary changes in the unfinished road grade, results in a total change in the road grade, so spread out that the pivot points 96, 96 will be returned to their original position before any hump or dip in the roadway has had time to be reflected in the finished pavement.

It should be understood that the individual leveling shoes and arms may be independently adjusted to provide a desired bank to the pavement.

It may further be seen that a simple novel and improved form of paving machine has been provided which lays, spreads and strikes-off paving material on a roadway and levels the same during the striking off thereof, and eliminates the usual heavy screed carried at the rear of the traction unit, and riding along the finished pavement.

It may further be seen that with the substitution of the light strike-off unit of our invention with the leveling shoes floating on the finished pavement, for the usual heavy screed, that the overhung weight at the rear end of the machine has been substantially reduced with a resultant transfer in the center of weight from the rear end of the machine forwardly along the traction unit, to a location between the front and rear axles.

It may still further be seen that the leveling shoes and arms are yieldably supported on the strike-off frame on the springs 90, 90, holding the shoes in floating contact with the finished pavement and affording a finer range of adjustment of the valves 75, 75, and elevation of the strike-off unit and relieving the pressure of the leveling shoes on the pavement, to avoid marking the pavement.

It will be understood that modifications and variations may be effected without departing from the scope of the novel concepts of the present invention.

We claim as our invention:

1. In a strike-off unit and in combination with a traction unit forming a draft and supporting means therefor, a strike-off frame, laterally spaced cylinder and piston units suspending said strike-off frame from the traction unit, valve means for said cylinder and piston unit, means automatically operating said valve means in accordance with the grade of the roadway comprising a link operatively connected with said valve means and extending upwardly therefrom, a spring on said strike-off frame having supporting engagement with said link, a leveling shoe connected to said strike-off frame adjacent the ground, for floating movement along the finished pavement, an operative connection between said leveling shoe and said link, comprising an upright leg pivoted to said shoe at one end, and a leveling arm having pivotal connection adjacent its forward end with said traction unit intermediate the ends of said traction unit, and supported by said leg adjacent its rear end, and being supported intermediate its ends by said control link.

2. In a road finishing machine, a traction unit having a rearwardly extending main frame and a strike-off unit suspended from the rear of said main frame and drawn by said traction unit along a roadway, two laterally spaced cylinder and piston units suspended from said main frame and connected with said strike-off unit for varying the elevation thereof in accordance with the grade of the roadway and the desired thickness of the pavement, valve means associated with said cylinder and piston units for admitting fluid under pressure thereto, means operating said valve means comprising two leveling arms, said arms extending along opposite sides of said traction unit and each of said arms being pivoted adjacent its forward end to said traction unit intermediate the ends of said traction unit, and extending longitudinally therealong at least to said valve means, control links depending from said arms and operatively connected with said valve means, means moving said leveling arms vertically to operate said valve means and vary the elevation of said strike-off unit, and spring means yieldably supporting said control links and leveling arms on said strike-off unit.

3. In a road finishing machine, a traction unit having a rearwardly extending main frame and a strike-off unit suspended from the rear of said main frame and drawn by said traction unit along a roadway, said strike-off unit having a strike-off blade depending therefrom for finishing the roadway, laterally spaced cylinder and piston means suspending said strike-off unit from said main frame, valve means associated with each cylinder and piston unit for admitting fluid under pressure thereto, means operating said valve means in accordance with the grade of the roadway and the desired thickness of the pavement comprising two leveling arms pivotally connected to said traction unit adjacent the forward end thereof and extending rearwardly of the rear end thereof, control links connected with said arms in the region of said valve means and depending therefrom and having operative connection with said valve means for operating the same, spring means yieldably supporting said control links on said strike-off unit, and leveling shoes having supporting connection with the rear ends of said leveling arms, said leveling shoes being pivotally connected to said strike-off unit closely adjacent the lower end of said strike-off blade and extending rearwardly therefrom, and having vertical support legs pivoted thereto and having supporting connection with said control links adjacent the rear ends thereof.

4. In a road finishing machine, a traction unit having a rearwardly extending main frame and a strike-off unit suspended from the rear of said main frame and drawn by said traction unit along a roadway, said strike-off unit having a strike-off blade depending therefrom for finishing the roadway, laterally spaced cylinder and piston means suspending said strike-off unit from said main frame, valve means associated with each cylinder and piston unit for admitting fluid under pressure thereto, means operating said valve means in accordance with the grade of the roadway and the desired thickness of the pavement comprising two leveling arms pivotally connected to said traction unit adjacent the forward end thereof and extending rearwardly of the rear end thereof, control links connected with said arms in the region of said valve means and depending therefrom and having operative connection with said valve means for operating the same, spring means yieldably supporting said control links on said strike-off unit, and leveling shoes having supporting connection with the rear ends of said leveling arms, said leveling shoes being pivotally connected to said strike-off unit closely adjacent the lower ends of said strike-off blade and extending rearwardly therefrom, and having vertical support legs pivoted thereto and having supporting connection with said control links adjacent the rear ends thereof, and adjusting means connected between said leveling arms and support legs for independently varying the spacing between said leveling shoes and leveling arms, and thereby operating said valve means to vary the elevation of said strike-off unit with respect to the roadway.

5. In a road paving machine, a mobile main frame, a strike-off unit extending transversely of said main frame adjacent the rear end thereof, hydraulic cylinder and piston means suspending said strike-off unit from said main frame and vertically adjusting the same with respect to said main frame, said strike-off unit including two aligned strike-off frames pivotally connected together at adjacent ends, for movement about an axis extending longitudinally of said main frame, means adjustably moving said strike-off frames about said longitudinal axis and holding the same in adjustment, an individual strike-off blade suspended from each frame and oscillatably driven with respect thereto, means for adjusting said strike-off blades in accordance with a predetermined thickness of pavement and the grade line of the roadway, comprising a leveling shoe transversely pivoted to each strike-off frame closely adjacent the strike-off blade thereof and projecting rearwardly therefrom, yieldable means carrying a greater part of the weight of said shoes on said strike-off frame including yieldably supported control links, and valve means connected with said control links and operated thereby upon relative movement between said leveling shoes and main frame, for controlling the admission and release of fluid under pressure to said cylinder and piston means, and the elevation of said strike-off blades with respect to the ground.

6. In a road paving machine and the like, a front traction unit and a rear strike-off unit carried thereby and moved therewith, said strike-off unit comprising two aligned strike-off frames pivotally connected together for adjustment about an axis extending longitudinally of said traction unit, and each having a strike-off blade suspended therefrom, an individual cylinder and piston unit for each strike-off frame suspending the same from said traction unit, drawbar means for said strike-off unit comprising parallel links connecting each strike-off frame with said main frame, valve means for each cylinder and piston unit, controlling the admission and release of fluid under pressure to said cylinder and piston units, leveling shoes pivoted to said strike-off frames closely adjacent the lower end portions of said strike-off blades and extending rearwardly therefrom, for floating contact with the roadway, leveling arms pivoted to opposite sides of said traction unit adjacent the forward end thereof and yieldably supported on said strike-off frames and extending rearwardly therefrom, a separate support leg pivotally connecting each leveling shoe with an associated leveling arm and effecting movement of the same with respect to said frame upon variations in the grade of the roadway, means adjustably connecting each leveling shoe with each leveling arm to vary the thickness of the pavement, and the means yieldably supporting said leveling arms on said strike-off unit, intermediate the ends of said leveling arms, comprising a separate control link connecting each leveling arm with an associated valve means to operate the same, and spring means yieldably supporting said control links on said strike-off frames.

7. A road finishing machine comprising a traction unit and a rear strike-off unit suspended from the rear end thereof, said strike-off unit comprising a strike-off frame extending transversely of said strike-off unit and having a strike-off blade depending therefrom and extending transversely of the roadway, a cylinder and piston unit suspending said strike-off unit from said traction unit, drawbar means connecting said strike-off unit to said traction unit and guiding said strike-off unit for vertical movement with respect thereto, valve means controlling operation of said cylinder and piston unit, means manually operable from said traction unit to operate said valve means and vary the elevation of said strike-off blade with respect to the ground at the will of the operator, a leveling shoe floatingly supported on said strike-off frame adjacent the ground and pivotally connected thereto closely adjacent said strike-off blade, a leveling arm transversely pivoted to said traction unit adjacent the forward end thereof and connecting said leveling shoe with said main frame, a control link connected between said leveling arm and said valve means to operate the same and automatically conform said strike-off blade to level out the roadway, and spring means engaging said control means and yieldably supporting said control link on said strike-off frame.

8. In a road finishing machine, a forward traction unit, a strike-off unit suspended from the rear end thereof and drawn thereby to strike off the roadway, said strike-off unit including two aligned transverse frame members pivotally connected at their adjacent ends, for adjustment about an axis extending along the longitudinal center of said traction unit, draw-bar means for said strike-off unit comprising separate parallel links, connecting each frame member with said traction unit, independent cylinder and piston units suspending each strike-off frame from said traction unit, valve means therefor for controlling the elevation of said strike-off unit with respect to the roadway, each of said strike-off frames having a pair of parallel links pivoted thereto and depending therefrom, strike-off blades pivoted to said links and suspended thereby and lapping at their inner ends, two eccentrics coaxial with the pivot of said strike-off frames, means for driving said eccentrics, individual eccentric straps connected from said eccentrics to the adjacent of sad parallel links for reciprocably driving said strike-off blades, deflecting plates extending downwardly from the advance sides of said strike-off frames and inwardly into engagement with said strike-off blades, and spring means yieldably engaging said deflecting plates with said strike-off blades to retain the paving material to the advance faces of said blades, to be struck off thereby.

9. In a road paving machine a forward traction unit and a rear strike-off unit suspended therefrom, said strike-off unit comprising two aligned strike-off frames pivotally connected together at their adjacent ends and each having a strike-off blade suspended therefrom for reciprocable movement transversely of the roadway, means adjustably said strike-off frames about their axis of connection together and holding the same in adjustment, to vary the angle of said strike-off blades with respect to each other in accordance with the desired crown of the roadway, cylinder and piston means suspending each strike-off frame from said main frame, draw-bar means for said strike-off unit, comprising spaced parallel links pivotally connected between said main frame and said traction unit, individual valve means for each cylinder and piston unit, means manually operable from said traction unit to operate said valve means, other means for automatically operating said valve means comprising individual leveling shoes for each cylinder and piston unit having floating contact with the finished pavement and pivoted to said strike-off frame closely adjacent said strike-off blades, individual leveling arms for each leveling shoe pivoted to said main frame adjacent the forward end thereof and extending rearwardly thereof, a control link for each leveling arm pivoted thereto and having operative connection with an associated valve means, spring means supporting each control link on said strike-off frame, and a support leg pivotally connecting each leveling shoe with an associated leveling arm to effect operation of said valve means upon variation in the angle between said traction unit and said leveling shoes.

10. In a strike-off unit and in combination with a traction unit forming a draft and supporting means therefor, a strike-off frame, fluid pressure operated means suspending said strike-off frame from said traction unit, valve means for controlling operation of said fluid pressure operated means, means automatically operating said valve means in accordance with the grade of the roadway comprising a control link operatively connected with said valve means, means yieldably supporting said control link on said strike-off frame, a leveling shoe connected to said strike-off frame adjacent the ground for floating movement along the finished pavement, and an operative connection between said leveling shoe and said control link, comprising a leveling arm pivotally connected adjacent its forward end on said traction unit pivotally supported adjacent its rear end on said leveling shoe and supported intermediate its ends on said yieldably supported control link.

11. In a strike-off unit and in combination with a traction unit forming a draft and supporting means therefor, a strike-off frame, laterally spaced cylinder and piston units supporting said strike-off frame from said traction unit, valve means controlling operation of said cylinder and piston units, means automatically operating said valve means in accordance with the grade of the roadway comprising a control link operatively connected with said valve means and extending upwardly therefrom, means yieldably supporting said control link on said strike-off frame, a leveling shoe pivotally connected to said strike-off frame adjacent the ground for floating movement along the finished pavement, and an operative connection between said leveling shoe and said control link comprising a leveling arm pivotally connected adjacent its forward end to said traction unit, pivotally supported adjacent its rear end on said leveling shoe and, supported intermediate its ends on said yieldably supported control link.

References Cited in the file of this patent
UNITED STATES PATENTS

| | | |
|---|---|---|
| 539,035 | Burwinkle | May 14, 1895 |
| 2,134,689 | French | Nov. 1, 1938 |
| 2,295,519 | Millikin | Sept. 8, 1942 |
| 2,351,593 | Barber | June 20, 1944 |
| 2,511,589 | Jaeger | June 13, 1950 |
| 2,589,256 | Horning | Mar. 18, 1952 |